United States Patent [19]
Soffer et al.

[11] 3,751,117
[45] Aug. 7, 1973

[54] ANTISKID APPARATUS

[75] Inventors: Jacques Soffer, Sceauz; Francois Tonnerieux, Fontenay Aux Roses, both of France

[73] Assignee: Societe Generale de Construction Electriques et Mechaniques (Alstom), Paris, France

[22] Filed: Nov. 18, 1970

[21] Appl. No.: 90,765

[52] U.S. Cl. .......................... 303/21 EB, 188/181 C
[51] Int. Cl. .............................................. B60t 8/06
[58] Field of Search .............................. 303/21 EB; 188/181 C; 317/5; 340/263

[56] References Cited
UNITED STATES PATENTS

| | | | |
|---|---|---|---|
| 3,503,654 | 3/1970 | Stamm | 303/21 EB |
| 3,556,610 | 1/1971 | Leiber | 303/21 P |
| 3,574,415 | 4/1971 | Stamm | 303/21 EB |
| 3,606,491 | 9/1971 | Walsh | 188/181 C |
| 3,608,978 | 9/1971 | Neisch | 303/21 EB |

Primary Examiner—Richard A. Schacher
Attorney—Flynn & Frishauf

[57] ABSTRACT

Antiskid apparatus wherein the velocity of two axles is electrically measured and a signal representing the velocity difference is fed to a differentiator device which operates a switching circuit when the change in velocity difference exceeds a predetermined value. The switching circuit then operates an antiskid device to reduce the velocity difference. A time delay is coupled to the switching circuit to maintain the switching circuit operated for a predetermined period of time after the switching circuit input is turned off (that is, after the change in velocity difference falls below a predetermined value.

4 Claims, 1 Drawing Figure

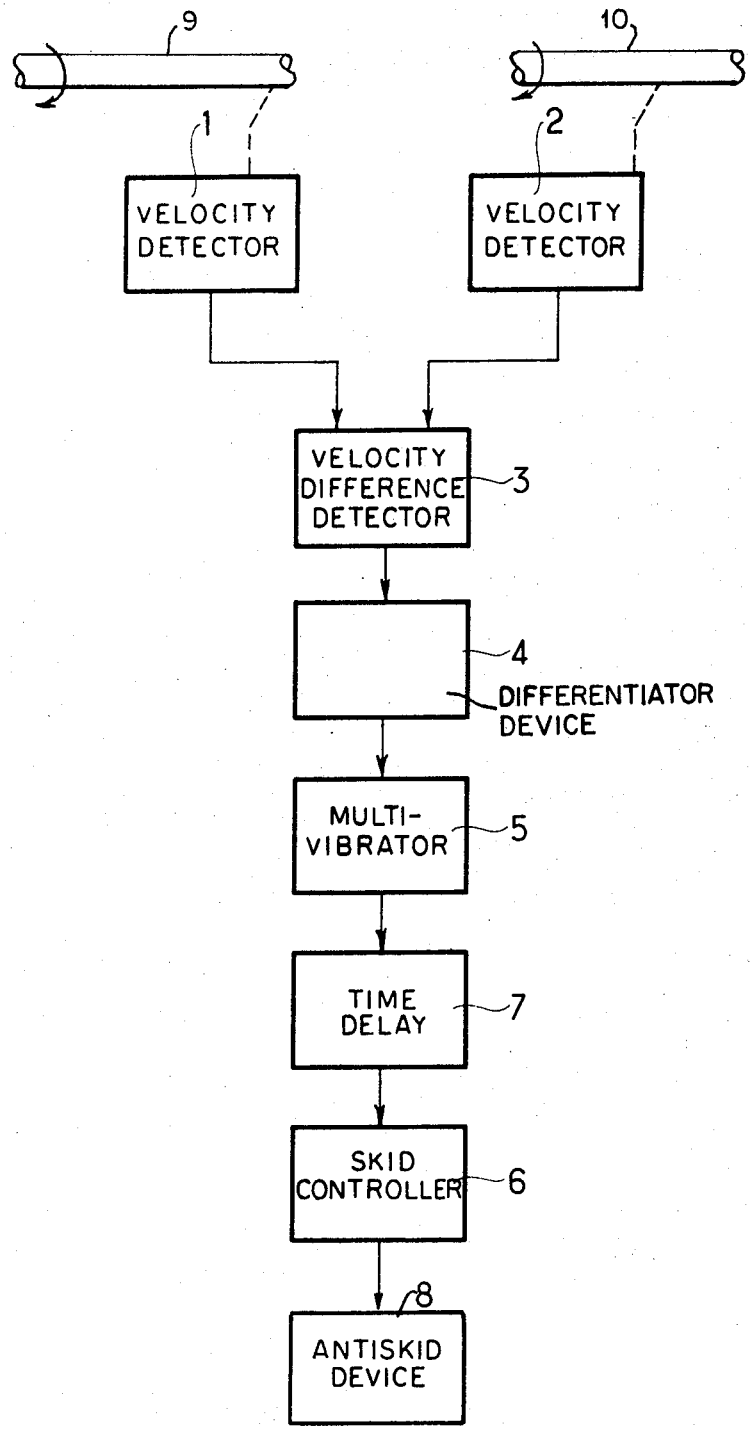

ANTISKID APPARATUS

The present invention relates to antiskid apparatus, including a novel skid-detector device, intended to prevent the slipping or skidding of a wheel, and more particularly to such a device which is particularly useful in motorized railroad vehicles.

Antiskid devices are known wherein the slipping of wheels is detected and is corrected. These devices generally compare the velocities of two or more axles, or measure acceleration of an axle. In most of the known antiskid systems, the velocities or acceleration are converted into continuous electrical signals, which are fed into a measurement device. In some other known systems, the velocities or acceleration are converted into electrical impulses.

With a system according to the invention and using measurement of velocity differences, it is not necessary to compensate for differences in wear and tear in the wheels. Moreover, the system of the invention is much more sensitive than systems using measurement of the acceleration of an axle.

The object of the present invention is to provide an antiskid apparatus having an improved skid-detection and control device.

SUMMARY OF THE INVENTION

The antiskid apparatus of the present invention includes means for measuring the velocity difference between two rotating axles. A differentiator device is placed at the output of the velocity difference measuring means. When the derivative exceeds a predetermined value a switching means responsive to the output of the differentiator device operates an antiskid device. A delay means is coupled to the switching device for maintaining the antiskid device operable for a predetermined period of time after the input signal thereto is turned off.

The present invention will be better understood from the following detailed description taken in conjunction with the accompanying single FIGURE which schematically illustrates an embodiment of the present invention.

Referring to the single FIGURE, the velocities of axles 9 and 10 are measured by velocity detectors 1 and 2, respectively, which generate output signals which are a function of the detected velocity. The output signals from detectors 1 and 2 are fed to a velocity difference detector 3 which measures the velocity difference between the two axles. Velocity difference detector 3 may be, for example, a comparator circuit providing an output signal which is a function of the difference between the input signals thereto. Such comparators are well known in the art, as are velocity detectors 1 and 2. The output signal of velocity difference detector 2 which may be termed a speed difference signal 3 is connected to a differentiator circuit 4. A multivibrator 5 is coupled to the output of differentiator circuit 4 which operates multivibrator 5 when the value of the derivative signal exceeds a predetermined threshold value, or "skid threshold." When the "skid threshold" is exceeded, multivibrator 5 is operated and in turn operates a skid controller 6 which is coupled to the output thereof. Skid controller 6 preferably is a switching circuit such as a relay, transistor switch, or the like. When controller 6 is operated, it controls antiskid device 8, which is constructed in accordance with known principles. Antiskid dvice 8 may be coupled to axles 9 and 10 and functions to reduce the rate of change of the velocity difference between axles 9 and 10. Such antiskid devices are well known in the art and are therefore not discussed in detail herein.

A time delay device 7 is coupled between skid controller 6 and multivibrator 5 to maintain the controller 6 operated for a predetermined period after multivibrator 5 is turned off. That is, the antiskid device 8 remains operative for a predetermined period of time after the derivative of the velocity difference between axles 9 and 10 falls below a value corresponding to the "skid threshold."

The particular design of each of the individual elements shown in the attached FIGURE is conventional and should be apparent to those skilled in the art. For example, velocity detectors generating electrical output signals and differentiator circuits responsive to electrical signals are well known. Skid controller 6 may, in a particular embodiment, comprise merely a relay. The time delay 7 may comprise a standard type of time delay element which is instantly actuated and which remains actuated for a predetermined period of time after its actuating signal is removed. Alternatively, the skid controller 6 and the time delay element 7 can be combined into a single time delay relay which is commercially available.

While the apparatus of the present invention is particularly useful in railroad vehicle applications, it should be clear that the principles of the invention are equally applicable for use in other types of vehicles or in any other application where the object is to detect and control slipping or skidding of a wheel or axle. It should be clear that many modifications and alterations may be made to the specific described embodiment of the present invention within the scope thereof as set forth in the accompanying claims.

We claim:

1. Antiskid apparatus comprising:
   means (1, 2, 3) for measuring the velocity difference between two rotating axles (9, 10) and providing a speed difference signal;
   a differentiator device (4) connected to the output from the velocity difference measuring means (1–3) differentiating the speed difference signal and generating a derivative output signal;
   switching means (5, 6) coupled to the output of said differentiator device (4) and operated when said derivative output signal exceeds a predetermined value;
   an antiskid device (8) responsive to the output of said switching means and being operable to reduce the rate of change of the velocity difference between said two axles; and
   delay means (7) coupled to said switching means (5,6) and holding said antiskid device in operated condition to extend the operating time of the antiskid device beyond the time when the input signal to the switching means has ceased maintaining said antiskid device (8) effective for a predetermined period of time after the input signal to said switching means is removed.

2. Apparatus according to claim 1 wherein said switching means includes a multivibrator (5) coupled to the output of said differentiator device, and a switching device (6) coupling the output of said multivibrator (5) to said antiskid device (8).

3. Apparatus according to claim 2 wherein said switching device (6) is a relay.

4. Apparatus according to claim 2 wherein said delay means (7) is coupled between said multivibrator (5) and said switching device (6) for maintaining said switching device (6) operated for a predetermined period of time after the input signal to said multivibrator is turned off.

* * * * *